US00RE41759E

(19) United States
(12) Reissued Patent
Helms

(10) Patent Number: US RE41,759 E
(45) Date of Reissued Patent: Sep. 28, 2010

(54) LOCKABLE SWIVEL APPARATUS AND METHOD

(76) Inventor: Charles M. Helms, 1600 E. Hwy 6, Suite 418, Alvin, TX (US) 77511

(21) Appl. No.: 10/413,938

(22) PCT Filed: Dec. 27, 1997

(86) PCT No.: PCT/US97/24043

§ 371 (c)(1),
(2), (4) Date: Feb. 11, 2000

(87) PCT Pub. No.: WO98/29637

PCT Pub. Date: Jul. 9, 1998

Related U.S. Patent Documents

Reissue of:
(64) Patent No.: 6,244,345
Issued: Jun. 12, 2001
Appl. No.: 09/331,982
Filed: Feb. 11, 2000

U.S. Applications:
(60) Provisional application No. 60/034,799, filed on Dec. 31, 1996.

(51) Int. Cl.
*E21B 7/04* (2006.01)
*E21B 19/18* (2006.01)

(52) U.S. Cl. ..... 166/301; 175/74
(58) Field of Classification Search ..... 175/61, 175/62, 73, 74; 166/301, 178
See application file for complete search history.

(56) References Cited

U.S. PATENT DOCUMENTS

| | | | | | |
|---|---|---|---|---|---|
| 2,100,418 | A | | 11/1937 | Welikanov | 175/45 |
| 3,313,345 | A | | 4/1967 | Fischer | 166/355 |
| 3,948,588 | A | | 4/1976 | Curington et al. | 417/405 |
| 4,051,456 | A | | 9/1977 | Heilhecker et al. | 340/18 |
| 4,064,953 | A | | 12/1977 | Collins | 175/321 |
| 4,074,775 | A | | 2/1978 | Lee | 173/79 |
| 4,106,575 | A | | 8/1978 | Bunnelle | 175/170 |
| 4,470,469 | A | | 9/1984 | Coakley et al. | 175/170 |
| 4,506,729 | A | | 3/1985 | Davis, Jr. et al. | 166/65 |
| 4,575,359 | A | | 3/1986 | Bermingham | 464/123 |
| 4,821,814 | A | | 4/1989 | Willis et al. | 173/164 |
| RE33,150 | E | * | 1/1990 | Boyd | 166/242.5 |
| 4,981,180 | A | | 1/1991 | Price | 173/164 |
| 4,992,997 | A | | 2/1991 | Bseisu | 367/82 |
| 5,086,844 | A | | 2/1992 | Mims et al. | 166/383 |
| 5,107,940 | A | | 4/1992 | Berry | 175/85 |
| 5,159,226 | A | | 10/1992 | Montgomery | 310/333 |
| 5,168,943 | A | * | 12/1992 | Falgout, Sr. | 175/74 |
| 5,251,709 | A | | 10/1993 | Richardson | 175/220 |
| 5,284,210 | A | * | 2/1994 | Helms et al. | 166/385 |
| 5,373,906 | A | * | 12/1994 | Braddick | 175/67 |
| 5,388,651 | A | * | 2/1995 | Berry | 175/85 |
| 5,396,952 | A | | 3/1995 | Stogner | 166/78 |
| 5,735,351 | A | | 4/1998 | Helms | 166/384 |
| 5,738,178 | A | | 4/1998 | Williams et al. | 175/61 |
| 5,996,712 | A | * | 12/1999 | Boyd | 175/321 |

FOREIGN PATENT DOCUMENTS

| | | | |
|---|---|---|---|
| GB | 2 307 495 | A | 5/1997 |
| JP | 5-311642 | * | 11/1993 |

* cited by examiner

*Primary Examiner*—William P Neuder
(74) *Attorney, Agent, or Firm*—David B. Dickinson

(57) ABSTRACT

A lockable swivel (4) for use in drilling applications which allows the operator to selectively engage and disengage the swivel (4). The lockable swivel (4) is comprised of a locking mandrel (7) carried in a body (3) which engages, upon actuation, splined surfaces (20, 21) within the swivel mandrel (5) thereby locking the two together. Various methods for the use of the lockable swivel (4) in wireline and other drilling operations are demonstrated.

58 Claims, 2 Drawing Sheets

LOCKABLE SWIVEL APPARATUS AND METHOD

Matter enclosed in heavy brackets [ ] appears in the original patent but forms no part of this reissue specification; matter printed in italics indicates the additions made by reissue.

This application claims the benefit of International Application No. PCT/US97/24043, filed Dec. 27, 1997, which claims the benefit of U.S. Provisional Application No. 60/034,799, filed Dec. 31, 1996.

DESCRIPTION

1. Technical Field

The present invention relates generally to a drill string apparatus for use in drilling operations, and more particularly to an apparatus and method for selectively locking an inline swivel to permit rotational movement of the drill string.

2. Background Art

In wireline operations, it is often desirable to selectively allow the drill string to rotate freely while the wireline operator manipulates the wireline.

Previously, if the operator desired to rotate the drill string during wireline operations, the wireline was pulled from the well bore and the entry devices were disengaged from the drill string. The removal of the wireline could be avoided if an inline swivel was placed in the drill string between the wireline device and the rotary table. This arrangement would permit rotation to be accomplished with a wireline in place, but effectively disengaged the top-drive unit from its preferred role of providing both lifting power and rotation to the drill string.

DISCLOSURE OF INVENTION

The invention disclosed herein provides an apparatus which would allow the connection of various wireline devices 106 to be placed in the drill string 100 between the top drive unit 102 and the rotary table 114 of a conventional drilling rig throughout wireline operations. Such devices 106 as the Boyd Borehole Drill Pipe Continuous Side Entry Or Exit Apparatus (such as described in U.S. Reissue Pat. No. 33,150) or applicant's Top Entry Sub Arrangement (as described in U.S. Pat. No. 5,284,210) may both be utilized for various wireline operations.

Referring to FIG. 4, the invention is a lockable in-line swivel device 110 which is selectively engaged by the operator to permit or inhibit rotational movement provided by a top drive unit 102 to be transmitted through the swivel 110 to the pipe string 112 and to allow disengagement of the locked swivel 110 so that rotation may be accomplished by the rotary table 114 simultaneously with the wireline operations.

Accordingly, it is the primary purpose of the invention disclosed herein to provide an apparatus and method which permits the wireline entry devices 106 described above to be left in the drill string 100 during all operations involving the wireline operation. This avoids the time consuming makeup and disengagement of the entry tools 106 required to safely permit entry of the wireline into the well bore. If rotation and longitudinal movement is desired with the invention disclosed herein, the wireline alone is removed from the wellbore, but the entry tool 106 remains in place and the swivel 110 is locked to provide transmission of all rotation through the swivel 110 into the pipe string 112.

At other times, the operator using a top-drive unit 102 may desire to pick up the drill string 100 and yet maintain torque which has been put into the pipe string 112 in pipe recovery operations. This is best done by engaging the swivel 110 in locked position and picking up with the top drive unit 102. As the torque is worked through the drill string 100, additional wireline operations may be desired. In this eventuality, the operator would set the drill string 100 down, disengage the swivel 110, continue to rotate with the rotary table 114 and continue the wireline operations.

Using prior conventional technology, the drill pipe was separated and raised high above the rig floor on each run in order to change out tools. Although the pipe can be rotated, the operator could not circulate or reciprocate the pipe during these periods. Circulation was achieved by adding a pump-in sub and another T.I.W. safety valve immediately above the existing T.I.W. valve; which, however, put the disconnect or break point between the upper T.I.W. valve and the swivel several feet above the rig floor creating a safety hazard while operating the rig tongs.

Further, since the tool strings must be stripped in and out beneath the upper assembly, a lubricator or tool protection device could not be used and all tools and explosives were brought onto the rig floor unshielded and unconfined. In the event of an inadvertent detonation of the explosive string shot or perforators, all personnel on the rig floor were totally exposed to this unnecessary life-threatening hazard.

Once rigged-up and going in the hole using conventional technology such as the Boyd side-entry sub, the wireline passed through the acute angle in the side entry sub. This caused excessive wearing of the wireline and creates sever grooving in the sub. The single rubber pack-off, which is commonly used with this system, is very susceptible to leaking and/or line gripping and stoppage during pump-down operations. The system cannot be used when working under surface pressure and with the need to utilize a grease injector and wireline blow out preventers (BOPs).

During pipe recovery operations, both right and left-hand torque must be worked down-hole using the rig tongs. This is a procedure has long been recognized to be one of the greatest safety hazards to be encountered during pipe recovery operations. When using this prior technology, pipe tongs were attached to the drill string and secured to the rig to hold torque that had been put into the drill string from the rotary table or top drive unit. With the present invention, this torque can be maintained while continuing circulation and wireline operation.

These and other objects, features, and advantages of the present invention will become apparent from the drawing and the descriptions given herein.

BEST MODE FOR CARRYING OUT THE INVENTION

Figure 1:
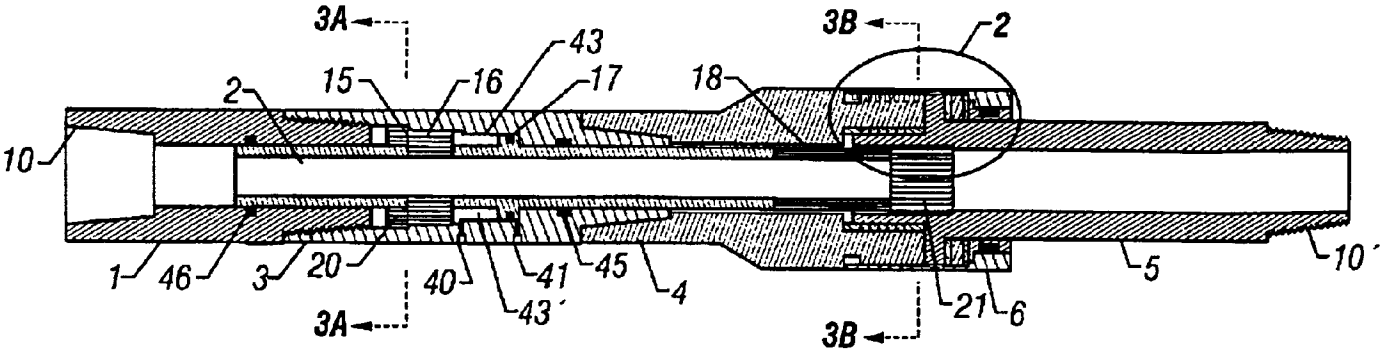
FIG. 1 is an sectional view of the tool of the invention.

In FIG. 1, the locking swivel apparatus 110 comprises a retainer sub 1 which is provided with means 10 for making a threaded connection with standard tubular members, and is threadably engaged with a lower body 3 to retain a locking mandrel 2. The locking mandrel 2 is provided with splines 16 and splines 18 to engage splined surfaces 20 and 21 respectively formed both in the swivel mandrel 5 and in the lower body 3 for locking the swivel to the lower body to prevent rotation of the pipe string 112 (See FIG. 4) which would be connected to threads 10'.

Figure 2:
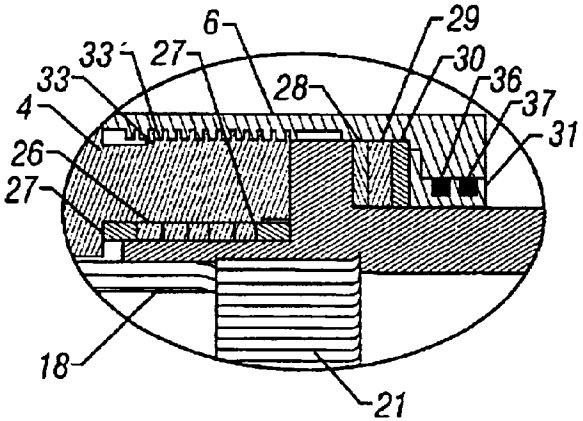
FIG. 2 is detailed view of the bearing arrangement of the invention encircled by ellipse of FIG. 1.

The retainer sub 1, locking mandrel 2, and lower body 3 of the lockable swivel apparatus 110 engage the top sub 4 of an inline swivel. Brass packing rings 27 and washpipe packing 26 seal swivel mandrel 5 permitting fluid communication through the annulus of the inline swivel apparatus without leakage. Swivel mandrel 5 is secured to the circumferentially spaced brass wear ring 31, bearing 29, packing 28 and 30 by a bearing retainer nut 6, which is threadably engaged on the top sub 4 by threads 33 and 33'. As shown in FIG. 2, the wear ring 31 has seal means 36, 37, which contact the bearing retainer nut 6. The lower body 3 is threadably engaged into the top sub 4 of the inline swivel. The swivel mandrel 5 of the inline swivel is provided with inner splines 21 to engage the outer splines 18 formed on the lower end of the locking mandrel 2 which extends through the lower body 3 and top sub 4.

Hydraulic fitting ports 40 and 41 provided in the lower body 3 are disposed on either side of a dynamic seal means 17 in a chamber formed between exterior of the locking mandrel 2 and the interior wall 43 of the lower body 3 to move the locking mandrel 2 either up or down and thereby into or out of engagement with the splines 21 on the swivel mandrel 5 and the splines 20 in the lower body 3. The locking mandrel 2 moves up or down as provided and is stopped by shoulder 15 from moving into retainer sub 1.

Washpipe packer or seal means 45 and 46 are provided to make a hydraulic seal in chamber 43' to enable an operator on the rig floor 116 to selectively move the locking mandrel 2 into and out of engagement with the swivel mandrel and to thereby control undesired rotation of the pipe string 112 by actuating a hydraulic pump.

In the preferred embodiment, standard hydraulic lines are attached to hydraulic fitting ports 40 and 41 and connected by hydraulic lines to a pump controlled by the operator in a manner well known to those in the industry. The operator switches the flow of hydraulic fluid to port 40 if locking of the swivel is desired, and to port 41 if unlocking of the swivel is desired.

Figure 3B:
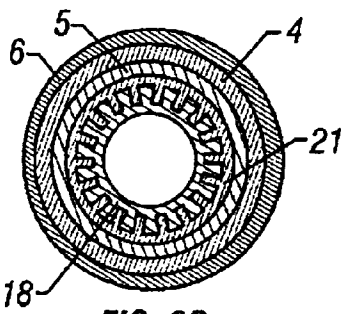
FIG. 3B is a cross-sectional view of the lower spline engagement surfaces along line 3B—3B of FIG. 1.
Figure 3A:
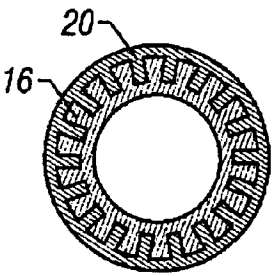
FIG. 3A is a cross-sectional view of the upper spline engagement surfaces along line 3A—3A of FIG. 1.

FIG. 2 of the drawings shows the detail of the bearing surfaces disposed around the swivel arrangement. FIGS. 3A and 3B are cross sectional views of the cooperating engagement surfaces or splines of the locking mandrel and the swivel mandrel.

When used in conjunction with wireline services on directional drilling operations, the magnetic or gyro-type tools have direct entry into the pipe string 112 through the top entry sub (a wireline access sub 106). Once the tools have been landed in the down-hole-guide sub, or in the wet-connect sub, the pipe string 112 can then be oriented using the rotary table 114, while maintaining the swivel 110 in the unlocked position. Once the desired orientation has been attained, the pipe can then be held in position by locking the swivel and engaging the back-brake on the top drive unit 102.

Should minor adjustments in the orientation be required, this can be easily accomplished since the locking mechanism in the swivel 110 incorporates a splined shaft which provides eighty three separate orientations per revolution. Utilization of this package enables drilling two or three joint per connection, depending on rig height, and eliminates holding the back-torque with the rig tongs.

In pipe recovery operations, once the downhole package has been assembled, the wireline tools always have direct entry into the pipe string 112 which eliminates having to separate and re-connect the pipe string 112 each run. Also, the tools can be fully lubricated which minimizes any bending, flexing or jarring of sensitive instrumentation. All explosive devices, such as string shots, cutters, severing tools and perforating guns are contained within the lubricator while in close proximity of the rig floor 116. This minimizes exposure to potential injury in the event of an inadvertent detonation. The assembly enables operation under surface pressure, while performing pump-down operations, and while employing a grease injector system. Between wireline runs, the operator retains the ability to continue circulation and reciprocation of the pipe string 112, thus preventing additional subsidence and sticking. During actual operations both make-up and reverse torque can be applied to the pipe string 112 and worked-down without utilizing the rig tongs. Prior to the ability to maintain the torque by setting the swivel 110 in the locked position, torque was maintained on the drill string by attaching pipe tongs to the string and cabling the end of the tong to the drilling structure while the operator reciprocates and manipulates the string. The disengagement of the pipe tong cabling while torque was being applied caused the tongs and cabling to dangerously rotate rapidly around the rig floor.

During pipe recovery operations, the wireline engineer must apply right hand, "make-up," torque to the pipe string 112 and work it down in order to assure that the entire string is sufficiently tight before applying the left hand, "back off," torque. With the pipe string 112 setting on the slips in the rotary table 114, usually at neutral weight, the right hand torque is applied to the pipe string 112 in an amount less than the full make-up torque of the string and then releasing or relaxing the brake on the pipe string 112. Non-absorbed torque will "come back." This process is then repeated three to four times, with each iteration providing greater amounts of torque, until a predetermined amount based upon the recommended maximum torque load for the type of pipe and connections has been reached. The drilling engineer also uses the behavior of the pipe string 112 during this process to determine the amount of torque the hole is "trapping" or whether the torque is being distributed evenly through-out the pipe string 112 or encountering premature build up because of angle changes, dog legs, etc.

With the right hand torque being held securely with the rotary back-brake or the rotary lock, the operator switches the manual control valve on the hydraulic pump from the open/unlocked position to the closed/locked position to begin closing the locking mechanism in the swivel 110. The operator should count the strokes and to observe the sudden pressure increase. If the number of strokes and the pressure change are consistent with the results experienced in the installation phase, the internal lock is completely closed. To assure that the swivel 110 remains in locked position, it is recommended that approximately 500 pounds of back pressure against the lock be maintained.

Figure 4:
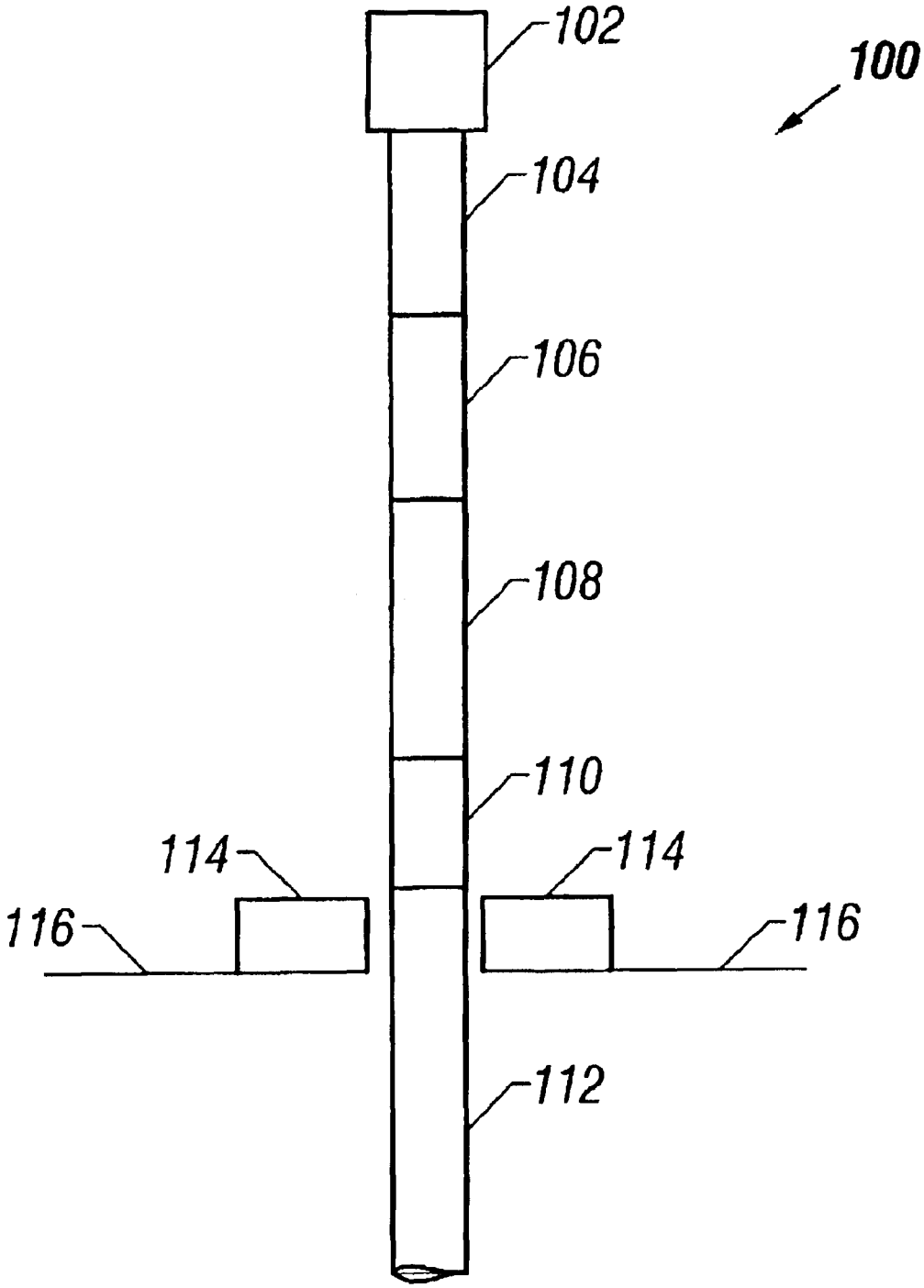
FIG. 4 is a graphical representation of a drill string 100.

Referring to FIG. 4 after determining that the back-brake on the top drive unit 102 is securely locked, the operator commences releasing the rotary table 114 back-brake and slowly transfers the pipe torque to the top drive unit 102. When the torque is being held with the rotary lock, engage the top drive and slowly increase the amperage until the torque is transferred and the rotary lock can be released. Once all the torque has been transferred to the top drive unit 102, the wireline access port will become shifted approximately 10.8 degrees to the left of true alignment. However, in this procedure the port will not shift if using a single joint but will shift 10.8 degrees to the right if using a lubricator joint 108. This is predicated on having one round per thousand in the drill pipe and the shifts are directly proportional to the amount of torque that is being transferred from the drill pipe into the assembly joint 104 between the top entry adapter sub (a wireline access sub 106) and the top drive unit, or the lubricator joint between the top entry sub and the swivel 110.

Once satisfied that the pipe string 112 has been sufficiently tightened to the point of accepting left-hand torque without breaking pre-maturely, the pipe string 112 can be placed back on the slips in the rotary table 114. The back-brake or the lock on the rotary table 114 should then be engaged.

With the weight of the pipe string 112 now resting on the rotary table 114, the torque being held with the top drive unit 102 can be slowly transferred to the rotary table 114.

With the torque transferred and the top drive unit 102 disengaged, the operator switches the controls on the hydraulic pump and opens or "unlocks" the swivel 110. As before, the operator should count the strokes and watch the pressure to assure that the swivel 110 is totally open, or "unlocked." Again, it is recommended that approximately 500 pounds of back pressure be maintained to assure that swivel 110 remains in the open or "unlocked" position. The wireline access sub 106 should then be realigned with the derrick sheave and the top drive unit 102 relocked. The torque can then be released with the rotary table 114. At this point, the engineer may elect to reciprocate the pipe string 112 in order to work out any remaining trapped torque prior to running the free point or other services.

The invention also enables rotating, circulating and reciprocating the pipe while running and pumping-down various wireline tools and performing various services, i.e., end-of-hole gyros, "measure-while-drilling" (M-W-D) retrieval tools, pipe recovery service tools, gamma ray logging devices or total "vertical depth" (T.V.D.) devices and other logging or perforating service tools.

Since the package can be assembled in a variety of configurations, customer preference, operating conditions and job requirements, whether involving directional drilling, pump downs, grease injectors, MWD retrieval, coil tubing or pipe recovery, will strongly influence which configuration is most advantageous for the job to be performed.

Once the chosen packages described above have been installed and tightened, the hydraulic hoses should be attached to the locking swivel 110 and the hand pump. The hoses, the swivel and the hand pump have mated quick-connects which assures that the labeling on the hand pump, closed/locked and open/unlocked corresponds correctly with the direction of movement and position of the internal locking mechanism within the swivel 110.

Lock the rotary table 114, or attach the back-up rig tongs to the joint of pipe in the rotary table 114, and the assembly can be tighten to maximum torque allowed using the top drive unit 102.

Engage the top drive unit 102 and slowly increase the amperage until the maximum foot pounds of torque allowed for the particular drill pipe being used in the upper assembly has been reached. Reduce the amperage to zero and then increase back to maximum allowed amperage at least one or two more times.

Once the assembly has been properly tightened and the top drive amperage reduced to zero, unlock the rotary, or release the back-up tongs, and then open, "unlock", the swivel.

Use the top drive unit 102 and slowly orient the upper assembly until the wireline access port in the top entry sub (a wireline access sub 106) is in perfect alignment with the wireline sheave in the derrick. The top drive unit 102 should then be locked in this alignment and secured so as to prevent inadvertent unlocking.

Upon making one final check and assuring that the top drive unit 102 is locked in the aligned position and the swivel 110 is in the unlocked position, the assembly will be ready to begin operations.

I claim:

1. A lockable swivel comprising a retainer sub, a lower body providing a cooperating surface [for engagement with] *to engage* a locking mandrel, said lower body connected to the retainer sub and enclosing the locking mandrel,

[a] *the* locking mandrel providing cooperating surfaces for engagement with the lower body, a swivel mandrel, a retainer nut connected to the lower body and enclosing the swivel mandrel,

[means for engaging] *the* cooperating surface [means between] *engaging* the locking mandrel and the swivel mandrel to permit relative rotational movement.

2. The lockable swivel of claim 1 wherein the retainer sub is provided with threaded connections for connecting to a drill string.

3. The lockable swivel of claim 1 wherein the cooperating surfaces of the mandrels are splines.

4. An in-line swivel apparatus for use in wireline operations on a drilling operation comprising:

a [tubular] retainer *sub* providing *a* threaded [connections for connecting the tubular body to the] *connection to a* drill string, a [first tubular] *lower* body providing spline surfaces [for engaging] *to engage* a locking mandrel, a [second tubular body] *top sub* providing cooperating spline surfaces [for engaging the] *to engage* surfaces of the locking mandrel and *to retain* a swivel mandrel,

*a* bearing [means] connected to the [tubular body] *top sub* to permit rotation of the swivel mandrel,

[a] *the* locking mandrel providing *first* cooperating surfaces [for engaging] *to engage* the *spline* surfaces of the [first tubular] *lower* body, and *second cooperating* surfaces [for engaging] to engage the swivel mandrel.

5. The in-line swivel of claim 4 wherein the locking mandrel is engaged by application of hydraulic fluid in a space formed between the inner surface of the first tubular body and the outer surface of the locking mandrel.

6. A method of using a lockable in-line swivel for the purpose of recovering a pipe string of a drill string, the method comprising the steps of:

connecting the swivel in a drill string, wherein the swivel is located between a top drive unit and a rotary table, locking the swivel, holding torque on the drill string with the top drive unit, reciprocating the drill string longitudinally to work torque down the pipe string, and thereafter affixing the pipe string to the rotary table to continue holding the torque on the pipe string while unlocking the swivel to thereby permit rotation of the drill string below the swivel without disengagement of wireline entry devices when present in the drill string above the swivel.

7. The method of claim 6 wherein a wireline entry device is connected in the drill string above the swivel and below the top drive unit.

8. A method of using a lockable in-line swivel for the purpose of recovering a pipe string of a drill string, the drill string having a wireline entry device, the method comprising the steps of:

connecting the in-line swivel in the drill string above a rotary table and below the wireline entry device and a top drive unit, engaging the drill string below the swivel on the pipe string with the rotary table, applying torque to the pipe string with the rotary table, holding the torque on the pipe string with the rotary table, locking the in-line swivel, releasing the torque held be the rotary table such that the torque on the pipe string is transferred to the locked in-line swivel and the top drive unit, reciprocating the drill string longitudinally to distribute the torque evenly over the entire length of the drill string, and thereafter affixing the pipe string to the rotary table to continue holding the torque on the pipe string while unlocking the swivel to thereby permit rotation of the drill string below the swivel without disengagement of the wireline entry device.

9. The method of claim 8 wherein the wireline entry device is a top entry sub.

10. The method of claim 8 wherein the wireline entry device is a side entry sub.

11. A method of using a swivel in a drill string to perform wireline services, wherein the drill string includes a wireline access device, the method comprising the steps of:

connecting the swivel in the drill string above a rotary table and below the wireline access device; and unlocking the swivel such that the portion of the drill string above the swivel is prevented from rotation while the portion of the drill string below the swivel can rotate freely and thus the drill string below the swivel can be rotated by the rotary table without having to remove the wireline access device.

12. The method of claim 11 wherein the wireline access device is a side entry sub.

13. The method of claim 11 wherein the wireline access device is a top entry sub.

14. The method of claim 11 wherein the swivel is locked hydraulically.

15. A method of using a swivel in a drill string to perform wireline services, wherein the drill string has a wireline access device, the method comprising the steps of:

connecting the swivel in the drill string above a rotary table and below the wireline access device such that the swivel can alternate from a locked position, in which the portion of the drill string below the swivel does not rotate independently of the portion of the drill string above the swivel, to an unlocked position in which the swivel allows the portion of the drill string below the swivel to rotate independently of the portion of the drill string above the swivel; and selectively alternating the swivel between its locked position and its unlocked position.

16. The method of claim 15 wherein the the wireline access device is a side entry sub.

17. The method of claim 15 wherein the the wireline access device is a top entry sub.

18. The method of claim 15 wherein the step of selectively alternating the swivel between its locked position and its unlocked position is performed hydraulically.

19. A drill string for use with a top drive unit and a rotary table comprising:

an assembly joint;

a wireline access sub;

a lubricator joint;

a lockable swivel according to claim 1; and a pipe string, wherein when the drill string is in use the assembly joint is located between the top drive unit and the wireline access sub, the lubricator joint is located between the wireline access sub and the lockable swivel, the lockable swivel is located between the top drive unit and the rotary table, and the pipe string is located below the lockable swivel.

20. The drill string according to claim 19, wherein the wireline access sub is a top entry sub.

21. The drill string according to claim 19, wherein the wireline access sub is a side entry sub.

*22. A lockable swivel, the swivel comprising:*

*a body having a first spline, a first connection to a drill string at a first end, and a bore to receive a swivel mandrel at a second end;*

*a retainer to retain said swivel mandrel within said body;*

*said swivel mandrel having a second spline configured to cooperate with said first spline and to actuate from an unlocked position to a locked position; and*

*said swivel mandrel having a second connection to the drill string.*

*23. The lockable swivel of claim 22 wherein said swivel mandrel is configured to rotate freely with respect to said body in said unlocked position.*

*24. The lockable swivel of claim 22 wherein said swivel mandrel is rotationally fixed with respect to said body in said locked position.*

*25. The lockable swivel of claim 22 wherein said swivel mandrel includes a locking mandrel.*

*26. The lockable swivel of claim 25 wherein said locking mandrel and said swivel mandrel are freely rotatable with respect to said body in said unlocked position.*

*27. The lockable swivel of claim 25 wherein said locking mandrel and said swivel mandrel are rotationally fixed with respect to said body in said locked position.*

*28. The lockable swivel of claim 22 wherein said body comprises a plurality of subs.*

*29. The lockable swivel of claim 28 wherein said plurality of subs includes a retainer sub having said connection to the drill string.*

*30. The lockable swivel of claim 28 wherein said plurality of subs includes a top sub having said bore to receive said swivel mandrel.*

*31. The lockable swivel of claim 22 wherein said body comprises a plurality of threadably engaged subs.*

*32. The lockable swivel of claim 22 wherein said swivel mandrel is coupled to a locking mandrel.*

*33. The lockable swivel of claim 32 wherein said swivel mandrel and said locking mandrel are releasably coupled together by splined surfaces.*

*34. A lockable swivel comprising:*

*a lower body having a first connection to a drill string, a first spline, and a bore;*

*a swivel mandrel to be received into said bore, said swivel mandrel including a second connection to the drill string and a second spline;*

*a retainer configured to retain said swivel mandrel within said lower body; and*

*said second spline configured to engage said first spline in a locked configuration and disengage in a swivel configuration.*

*35. The lockable swivel of claim 34 wherein said swivel mandrel is freely rotatable with respect to said lower body in said swivel configuration.*

*36. The lockable swivel of claim 34 wherein said swivel mandrel is rotationally fixed with respect to said lower body in said locked configuration.*

*37. The lockable swivel of claim 34 wherein said swivel mandrel includes a locking mandrel.*

*38. The lockable swivel of claim 37 wherein said locking mandrel and said swivel mandrel are configured to rotate freely with respect to said lower body in said swivel configuration.*

*39. The lockable swivel of claim 37 wherein said locking mandrel and said swivel mandrel are rotationally fixed with respect to said lower body in said locked configuration.*

*40. The lockable swivel of claim 34 wherein said lower body comprises a plurality of subs.*

*41. The lockable swivel of claim 40 wherein said plurality of subs includes a top sub having said bore to receive said swivel mandrel.*

*42. The lockable swivel of claim 40 wherein said plurality of subs includes a retainer sub having said first connection to the drill string.*

*43. The lockable swivel of claim 34 wherein said lower body comprises a plurality of threadably engaged subs.*

*44. The lockable swivel of claim 34 wherein said swivel mandrel is coupled to a locking mandrel.*

*45. The lockable swivel of claim 44 wherein said swivel mandrel and said locking mandrel are coupled together by splined surfaces.*

*46. A method to perform drilling services using a top drive assembly, the method comprising:*

*connecting a lockable swivel to a drill string above a rotary table and below an access sub;*

*unlocking the lockable swivel;*

*deploying a tool through the access sub, the lockable swivel, and the drill string;*

*rotating the drill string below the lockable swivel with the rotary table; and*

*holding the access sub stationary with the top drive assembly.*

*47. The method of claim 46 wherein sections of drill pipe separate the lockable swivel and the access sub.*

*48. The method of claim 46 wherein the access sub is a wireline top entry sub.*

*49. The method of claim 46 wherein the access sub is a wireline side entry sub.*

*50. The method of claim 46 further including reciprocating the drillstring, lockable swivel, and access sub to work torque down a wellbore.*

*51. The method of claim 46 wherein the drilling services include wireline services.*

*52. The method of claim 46 wherein the drilling services include directional drilling.*

*53. The method of claim 46 wherein the drilling services include pipe recovery.*

*54. A drill string for use with a top drive unit and a rotary table comprising:*

*an assembly joint located between the top drive unit and a wireline access sub;*

*a lubricator joint located between the wireline access sub and a lockable swivel; and*

*a pipe string below the lockable swivel passing through the rotary table.*

*55. A method of using a lockable in-line swivel to recover a pipe string of a drill string, the method comprising:*

*connecting the swivel in the drill string, wherein the swivel is located between a top drive unit and a rotary table,*

*locking the swivel,*

*holding torque on the drill string with the top drive unit,*

*reciprocating the drill string longitudinally to work torque down the pipe string, and*

*thereafter affixing the pipe string to the rotary table to continue holding the torque on the pipe string while unlocking the swivel to thereby permit rotation of the drill string below the swivel without disengagement of wireline entry devices when present in the drill string above the swivel.*

*56. A method of using a lockable in-line swivel to recover a pipe string of a drill string, the drill string having a wireline entry device, the method comprising:*

*connecting the in-line swivel in the drill string above a rotary table and below the wireline entry device and a top drive unit,*

*engaging the drill string below the swivel on the pipe string with the rotary table,*

*applying torque to the pipe string with the rotary table,*

*holding the torque on the pipe string with the rotary table,*

*locking the in-line swivel,*

*releasing the torque held by the rotary table such that the torque on the pipe string is transferred to the locked in-line swivel and top drive unit,*

*reciprocating the drill string longitudinally to distribute the torque evenly over the entire length of the drill string, and*

*thereafter affixing the pipe string to the rotary table to continue holding the torque on the pipe string while unlocking the swivel to thereby permit rotation of the drill string below the swivel without disengagement of the wireline entry device.*

*57. A method of using a swivel in a drill string to perform wireline services, wherein the drill string includes a wireline access device, the method comprising:*

*connecting the swivel in the drill string above a rotary table and below the wireline access device; and*

*unlocking the swivel such that the portion of the drill string above the swivel is prevented from rotation while the portion of the drill string below the swivel can rotate freely and thus the drill string below the swivel can be rotated by the rotary table without having to remove the wireline access device.*

*58. The method of claim 57 further comprising locking the swivel such that the portion of the drill string above the swivel rotates with the portion of the drill string below the swivel.*

* * * * *